United States Patent [19]
Arai

[11] Patent Number: 4,677,966
[45] Date of Patent: Jul. 7, 1987

[54] SOLAR HEAT COLLECTOR ASSEMBLY

[75] Inventor: Nobushige Arai, Nara, Japan

[73] Assignee: Sharp Kabushiki Kaisha, Osaka, Japan

[21] Appl. No.: 837,653

[22] Filed: Mar. 5, 1986

Related U.S. Application Data

[60] Continuation of Ser. No. 687,270, Dec. 28, 1984, abandoned, which is a division of Ser. No. 637,690, Aug. 6, 1984, Pat. No. 4,526,162, which is a continuation of Ser. No. 485,286, Apr. 15, 1983, abandoned.

[30] Foreign Application Priority Data

Oct. 29, 1982 [JP] Japan ............................. 57-164793[U]

[51] Int. Cl.$^4$ .............................................. F24J 3/00
[52] U.S. Cl. ..................................... 126/450; 126/411
[58] Field of Search ................ 126/450, 417, 445, 449

[56] References Cited

U.S. PATENT DOCUMENTS

| 4,164,933 | 8/1979 | Alosi | 126/450 X |
| 4,213,449 | 7/1980 | Roth et al. | 126/447 |
| 4,263,896 | 4/1981 | Zebuhr | 126/450 |
| 4,399,972 | 8/1983 | McCulloch | 248/346 |

Primary Examiner—Larry Jones
Attorney, Agent, or Firm—Birch, Stewart, Kolasch & Birch

[57] ABSTRACT

A solar heat collector assembly including a heat collector plate, a base for accommodating therein the heat collector plate, and a top cover for joining with the base for housing the heat collector plate. The base is made of a foamed resinous material and is provided with a latticed configuration which defines a plurality of cavities therein. The top cover is provided a number of air cavities serving as heat insulators.

1 Claim, 8 Drawing Figures

SOLAR HEAT COLLECTOR ASSEMBLY

This application is a continuation of application Ser. No. 687,270 filed on Dec. 28, 1984, now abandoned which is a divisional of U.S. application Ser. No. 637,690, now U.S. Pat. No. 4,526,162 issuing on Aug. 6, 1984, which is a continuation of U.S. Ser. No. 485,286 filed Apr. 15, 1983, now abandoned.

BACKGROUND OF THE INVENTION

The present invention relates to a solar heat collector assembly, and more particularly to an improved solar heat collector assembly.

A conventional type of solar heat collector assembly comprises a base made by a box-like extrusion of Aluminum with an open top surface for accommodating therein one heat collector plate, and a top cover made of transparent glass, sealed on the open top surface of the base.

To avoid heat radiation from a bottom surface of the base, a heat insulating material such as glass wool or the like is laid on the bottom surface of the base.

Since the heat insulating material is additionally required, the assembly is made heavy as a result.

Accordingly, the number of solar heat collector assemblies laying on the roof are limited, and it takes time to lay the assemblies on the roof.

Further, the cost of the heat collector assembly becomes expensive because of the use of extruded Aluminum and the glass plates as building materials.

Therefore, heat collector assemblies made of various plastic materials are offered in order to reduce the weight of the whole assembly or reduce its price.

But, the prior art heat collector assemblies are complex and expensive, or otherwise their heat collecting efficiency is low.

OBJECT AND SUMMARY OF THE INVENTION

Accordingly, it is an object of the present invention to provide an improved solar heat collector asssembly which overcomes the above problems with prior art devices.

It is another object of the present invention to provide an improved light solar heat collector.

It is a further object of the present invention to provide an improved solar heat collector comprising a heat-insulating base.

It is a further object of the present invention to provide an improved solar heat collector assembly which has a similar heat collecting efficiency as that of the prior art device, the same strength of the prior art device, and is one-half the weight of the prior art device.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a solar heat collector assembly comprises a heat collector plate, a base for accommodating therein the heat collector plate, and a top cover for jointing with the base. The base is made of a foamed resin material with a lattice configuration and having a plurality of concavites therein.

The top cover is provided a number of air cavities, each serving as a heat insulator.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
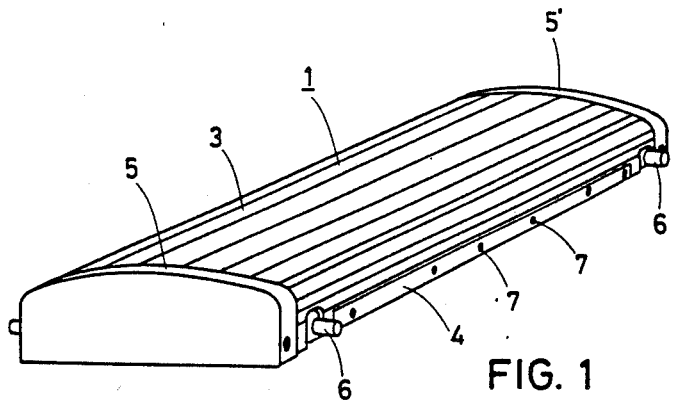
FIG. 1 is a perspective side view of a solar heat collector assembly according to an embodiment of the present invention.
Figure 2:
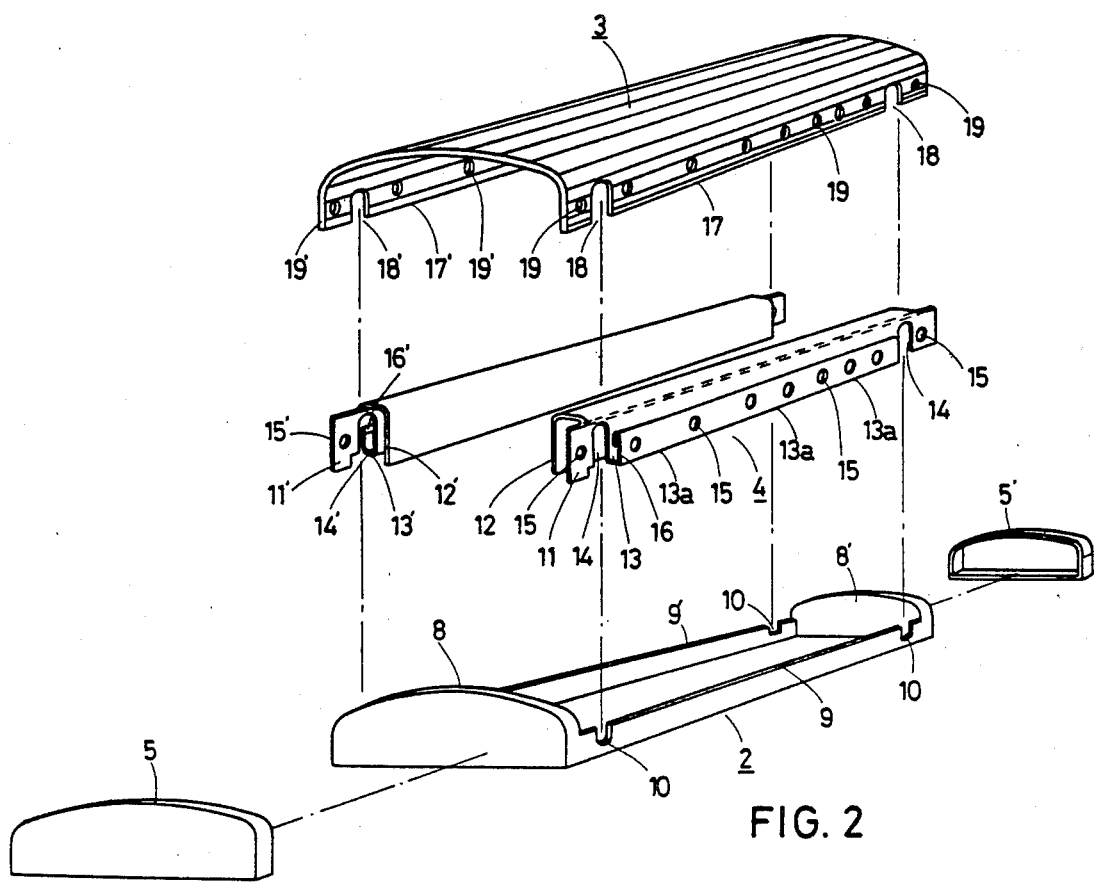
FIG. 2 is an exploded view of the solar heat collector assembly of FIG. 1.
Figure 3:
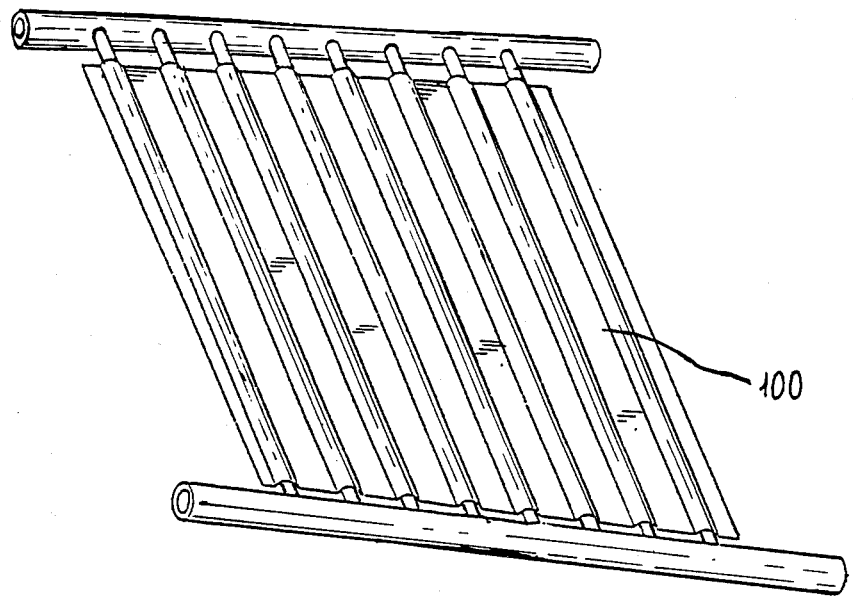
FIG. 3 is a perspective side view of a heat collector plate of the solar heat collector assembly of FIG. 1.
Figure 4:
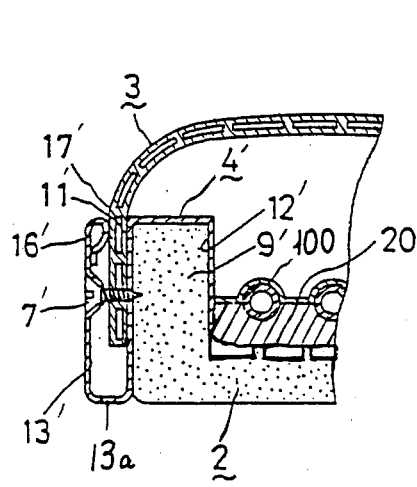
FIG. 4 is a partial cross sectional view of the solar heat collector assembly as shown in FIG. 1.

FIGS. 1 to 4 illustrate a solar heat collector assembly constructed according to an embodiment of the present invention. The solar heat collector assembly 1 generally includes a base 2 of a box-like configuration with an open top surface for accommodating therein one heat collector plate 100 of a known structure (as shown in FIG. 3), a reverse "U" shaped top cover 3 of a proper plastic material provided for ensuring efficient collection of solar heat and minimization of heat loss to the surrounding atmosphere, and a pair of groove members 4 and 4' of an "S" sharped transverse cross section for joining the top cover 3 to the base 1. The top cover 3 contains a number of air cavities each serving as a heat insulator as shown in FIG. 4 for increasing the heat insulating efficiency.

There are further provided a pair of box-like edge covers 5 and 5' fitted at the left and right edges of the heat collector assembly 1, header pipes 6 for water conduits within the heat collector plates and fixtures 7.

The base 2 is made of a proper heat insulating material, preferably, a foamed plastic material such as a foamed polystyrene resin, a foamed ABS resin, a foamed polyurethane resin, a foamed polyester resin and a foamed polyester resin with moderate expansion and contraction due to a temperature change to reduce the weight of the whole assembly. The left and right walls 8 and 8' of the base 2 are similar in shape to the top cover 3 of the reverse "U" cross section so that they are maintained with close contact with the left and right inside edges of the top cover 3. Formed in the neighborhood of the front and back walls 9 and 9' of the base 2 are slots 10 which receive the header pipes 6 leading to the water conduits in the heat collector plates.

The two groove members 4 and 4' are snugly fitted around the front and back walls 9 and 9' of the base 2 and take the same shape and configuration. The following is an explanation of the front groove member 4 only for the convenience of illustration. The groove member 4 is curved which is defined by a partition 11 of the same length as that of the base 2 and bears substantially the "S" shaped transverse cross section having a downward-oriented inside groove 12 and an upward-oriented outside groove 13. In addition, slots 14 are perforated to align with those 10 in the base 2 in the neighborhood of the left and right edges of the partition 11. The downward groove 12 has the same length as the distance between the left and right walls 8 and 8' of the base 2, while the upward groove 13 has the same length as the distance between the slots 14. Openings 15 are provided for the fixtures 7. An ear 16 is inwardly directed to prevent ingress of water and is springly held in pressure contact with the outer surface of the front wall of the top cover 3.

Openings 13a of about 5–6 mm in diameter are suitably provided to let water out of the upward grooves 13 and 13' in the bottom edge of the upward grooves 13 and 13'.

The rear groove member 4' is symmetrical with the front groove member 4. The top cover 3 has the same length as that of the base 2 and takes the reverse "U" cross section as described above. Preferably, the top cover 3 is an integrally formed plastic member having a number of air cavities each serving as a heat insulator as illustrated in FIG. 4. Left and right edge slots 18 and 18' which correspond to the slots 10 and 10' and 14 and 14' are provided in the neighborhood of the front and back walls 17 and 17' of the cover 3.

Lower portions of the front and back walls 17 and 17' of the top cover 3 are formed with openings 19 and 19' to align with opening 15 and 15' for the fixtures.

The following description shows that to assemble the base 2, the top cover 3 and the groove members 4 and 4'. The front and back walls 9 and 9' of the base 2 are fitted within the downward grooves 12 and 12' of the respective groove members. The inner surfaces of the left and right edges of the top cover 3 are placed on the left and right walls 8 and 8' of the base 2. The front and back walls 17 and 17' of the top cover 3 are then closely fitted in the outside upward grooves 13 and 13' of the respective groove members. Under the circumstances, the base 2 and the top cover 3 are joined by means of the fixtures screwed into the openings 15 and 19. A Water Hermetic seal is completed by mounting the edge covers 5 and 5' on the left and right edges of the assembly and fixing the same by means of the fixtures 7. The resulting solar heat collector assembly is illustrated in a perspective view of FIG. 1.

In assembling these shell components, internal components including the heat collector plates 100, the header pipes 6, the heat insulator 20, etc. should be held in proper positions on the base 2.

The front and back walls 17 and 17' of the top cover 3 are closely fitted with the outside surface of partions 11 and 11' about 30–40 mm from their end edges. The end edges of the front and back walls 17 and 17' are left about 5–10 mm from the bottom portion of the grooves 13 and 13'.

Figure 5:
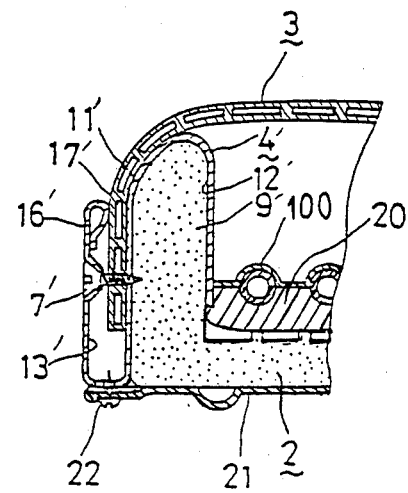
FIG. 5 is a partial sectional view of a solar heat collector assembly according to an another embodiment of the present invention.

FIG. 5 shows another embodiment wherein an upper portion of the front and back walls of the base 2 has an upward extension of an arch-shaped cross section to tightly secure the fixtures of the groove members and the top cover. A metal-made bottom plate 21 is additionally provided and secured on the bottom of the base 2 by means of screws 22 inserted into the bottom of the groove member 4', thus enhancing the strength of the whole solar heat collector assembly 1.

Figure 6:
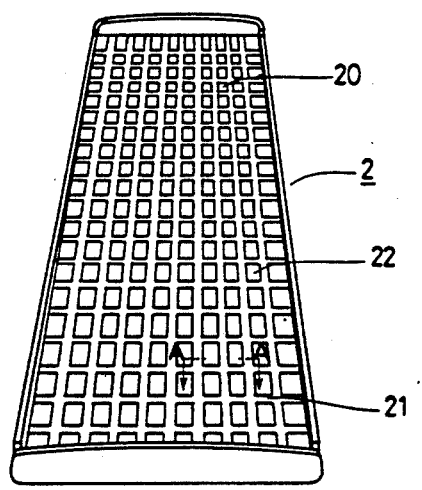
FIG. 6 shows the base for accommodating the heat collector.
Figure 7:
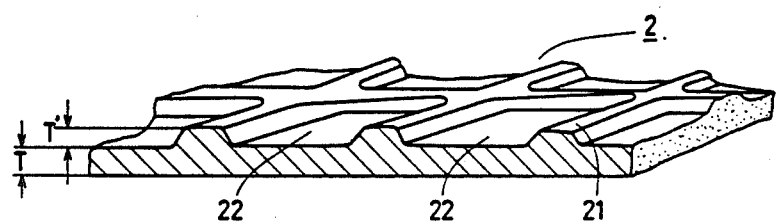
FIG. 7 is a cross sectional view taken along line A—A of FIG. 6.
Figure 8:
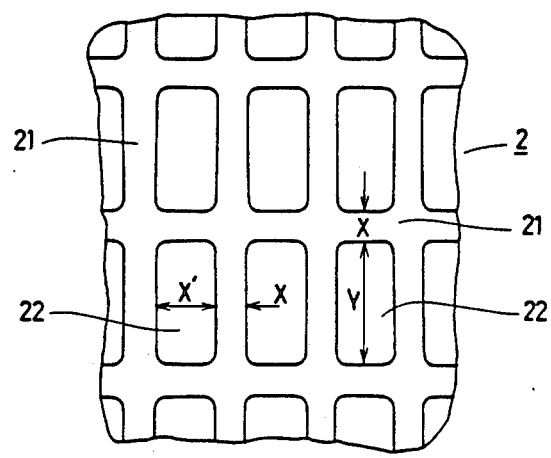
FIG. 8 is a plane view of the base rib structure.

The base 2 of the present invention is shown in FIG. 6. FIG. 7 is a cross sectional view taken along line A—A in FIG. 6. Latticed ribs 21 are projected all over the oven bottom surface 22 of the base 2. When the thinkness T of the base 2 is more than about 10 mm, the height T' of one of the ribs 21 is preferably about 5–10 mm. The sectional plan of the rib 21 is a trapezoid. The width X of one of the ribs 21 projected on the oven bottom surface 22 of the base 2 as shown FIG. 6, is preferably about 10–20 mm. The width X' of one of the rectangular concaveties 22 which are surrounded with the ribs 21, is preferably about 20–70 mm, and the length Y of one of the concaveties 22 is preferably about 60–120 mm.

When the base 2 is made of the foamed styrene resin, a heat-resisting grade resin for withstanding a high temperature at about 100° C., normal grade resins for withstanding a temperature at about 80° C., a nonflammable grade resins for withstanding more than about 100° C., can all be used as the material of the base 2. If the base 2 is made only of the foamed styrene resin, a low-foamed resin having an expansion of 10 times is preferable because of the strength of the base 2.

In the case where the base 2 is made of a foamed styrene resin with an expansion of 30–40 times, an Aluminum plate, a stainless steel plate, or a surface treated color steel plate of 0.1–0.3 mm in thinkness is combined with the base 2 on the outside and oven the bottom surface thereof and around the surrounding surfaces of the base 2 for enhancing tthe strength of the base 2. Since acrylic type paints of enamel color is suitable for weather proofing and tight coupling, being fitted to a foamed styrene resin, they can be coated with about 10–20 μmm in thinkness on those portions of the base 2 which are exposed to the outside.

According to the present invention, the base is made of a foamed resin material which is rather light, and the latticed ribs are projected on the oven bottom surface of the base by forming the concavites 22 to thereby reduce the total weight of the base 2 while maintaining it's strength.

The solar heat collector of the present invention is lighter than the prior art devices which is made by the extrusion of Aluminum and has a similar weight-resistance and strength of the prior art devices.

Accordingly, many solar heat collector assemblies can be disposed on a roof so that it does not take time to lay the assemblies on the roof because of lightness.

According to the test of the present inventor, the weight of the solar heat collector assembly of the present invention is half as light as the weight of the prior art device. For example, the weight of the assembly of the present invention is about 12 Kg/m$^2$, the weight of whereas similar size prior art devices is about 25 Kg/m$^2$.

Because the base is made of the foamed resin material, the heat collector assembly is inexpensive in comparision with the prior art devices which are made by the extrusion of Aluminium. The cost of the solar collector assembly can be reduce in comparision with the cost of prior art devices and, foamed resin materials have the function of heat insulating according the present invention.

An additional heat insulating material such as glass wool or the like does not need to lay on the oven bottom surface of the base 2. The invention being thus described, it will be obvious that the same may be varied in many ways. Such variations are not to be regarded as a departure from the spirit and scope of the invention, and all such modifications are intended to be included within the scope of the following claims.

What is claimed is:
1. A solar heat collector assembly comprising:
a heat collector means,
a top cover means for the heat collector means containing a plurality of air cavities for increasing the heat insulating efficiency of said assembly, and
a base means for accommodating said heat collector means made of a foamed resinous heat insulating material, said top cover means joining with said base means to house said heat collector means, said base means including a latticed rib configuration portion extending therefrom comprising a multiplicity of ribs defining a plurality of rectangularly shaped concavities therebetween, said ribs having a trapezoidal configuration which enhance the stability of said heat collector assembly.

* * * * *